(12) United States Patent
Gupta et al.

(10) Patent No.: US 10,944,740 B2
(45) Date of Patent: *Mar. 9, 2021

(54) CLUSTER CLAIM

(71) Applicant: Cohesity, Inc., San Jose, CA (US)

(72) Inventors: Anubhav Gupta, Sunnyvale, CA (US); Mahesh Kumar, San Ramon, CA (US); Samual Krish Ravichandran, Sunnyvale, CA (US); Subramanian Sethumadhavan, San Jose, CA (US); Sudhir Srinivas, Cary, NC (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,413

(22) Filed: Jun. 27, 2019

(65) Prior Publication Data
US 2020/0084203 A1    Mar. 12, 2020

Related U.S. Application Data

(63) Continuation of application No. 16/206,670, filed on Nov. 30, 2018, now Pat. No. 10,389,704.
(Continued)

(51) Int. Cl.
*H04L 29/06* (2006.01)
*H04L 29/08* (2006.01)
(Continued)

(52) U.S. Cl.
CPC ........ *H04L 63/0823* (2013.01); *G06F 3/0605* (2013.01); *G06F 3/067* (2013.01);
(Continued)

(58) Field of Classification Search
CPC . H04L 63/0823; H04L 63/061; H04L 63/062; H04L 63/067; H04L 63/10; H04L 67/1097; H04L 67/306; G06F 16/9538
See application file for complete search history.

(56) References Cited

U.S. PATENT DOCUMENTS

2009/0037224 A1    2/2009  Raduchel
2010/0031349 A1    2/2010  Bingham
(Continued)

*Primary Examiner* — Michael R Vaughan
(74) *Attorney, Agent, or Firm* — Van Pelt, Yi & James LLP

(57) ABSTRACT

Cluster state information is generated in response to a request to establish a connection with a cloud service system. The cluster state information includes a first instance of a security token and host information. The cluster state information is provided to a web browser associated with a user. The web browser associated with the user is redirected to a cloud identity provider. The cloud identity provider is configured to provide to the cloud service system via the web browser associated with the user, the cluster state information that includes the first instance of the security token and the host information. A certificate is requested from the cloud service system. The cluster state information that includes a second instance of the security token is provided to the cloud service system. The cloud service system is configured to establish the connection based on comparison between the first instance of the security token and the second instance of the security token. The established connection enables the user to manage a secondary storage system via the cloud service system.

20 Claims, 5 Drawing Sheets

Related U.S. Application Data

(60) Provisional application No. 62/730,458, filed on Sep. 12, 2018.

(51) Int. Cl.

| | |
|---|---|
| *G06F 16/9538* | (2019.01) |
| *G06F 3/06* | (2006.01) |
| *H04L 9/08* | (2006.01) |
| *H04L 9/32* | (2006.01) |
| *H04L 12/741* | (2013.01) |
| *G06F 9/451* | (2018.01) |
| *G06F 9/455* | (2018.01) |
| *G06F 11/14* | (2006.01) |
| *G06F 12/0868* | (2016.01) |

(52) U.S. Cl.
CPC .......... *G06F 3/0622* (2013.01); *G06F 3/0634* (2013.01); *G06F 3/0664* (2013.01); *G06F 9/451* (2018.02); *G06F 9/45558* (2013.01); *G06F 11/1464* (2013.01); *G06F 12/0868* (2013.01); *G06F 16/9538* (2019.01); *H04L 9/0825* (2013.01); *H04L 9/3247* (2013.01); *H04L 9/3263* (2013.01); *H04L 45/745* (2013.01); *H04L 63/02* (2013.01); *H04L 63/061* (2013.01); *H04L 63/062* (2013.01); *H04L 63/067* (2013.01); *H04L 63/0807* (2013.01); *H04L 63/10* (2013.01); *H04L 67/10* (2013.01); *H04L 67/1002* (2013.01); *H04L 67/1097* (2013.01); *H04L 67/16* (2013.01); *H04L 67/2814* (2013.01); *H04L 67/2842* (2013.01); *H04L 67/306* (2013.01); *H04L 67/32* (2013.01); *G06F 2009/45595* (2013.01); *G06F 2201/84* (2013.01); *G06F 2212/152* (2013.01)

(56) References Cited

U.S. PATENT DOCUMENTS

| | | |
|---|---|---|
| 2010/0169591 A1 | 7/2010 | Atluri |
| 2010/0332479 A1 | 12/2010 | Prahlad |
| 2013/0111572 A1 | 5/2013 | Gaddam |
| 2015/0149530 A1 | 5/2015 | Maret |
| 2015/0227749 A1 | 8/2015 | Schincariol |
| 2016/0337426 A1 | 11/2016 | Shribman |
| 2017/0155639 A1* | 6/2017 | Hu ................. H04L 67/1097 |
| 2018/0075231 A1 | 3/2018 | Subramanian |
| 2018/0150234 A1 | 5/2018 | Karmarkar |
| 2018/0165299 A1 | 6/2018 | Danilov |
| 2018/0285210 A1 | 10/2018 | Mitkar |
| 2019/0036678 A1 | 1/2019 | Ahmed |
| 2019/0075130 A1 | 3/2019 | Petry |

* cited by examiner

US 10,944,740 B2

CLUSTER CLAIM

CROSS REFERENCE TO OTHER APPLICATIONS

This application is a continuation of co-pending U.S. patent application Ser. No. 16/206,670, entitled CLUSTER CLAIM filed Nov. 30, 2018 which is incorporated herein by reference for all purposes, which claims priority to U.S. Provisional Patent Application No. 62/730,458 entitled MANAGEMENT OF SECONDARY STORAGES AND APPLICATIONS filed on Sep. 12, 2018, which is incorporated herein by reference for all purposes.

BACKGROUND OF THE INVENTION

A datacenter may be comprised of a primary system and a secondary storage system. A user associated with the datacenter may remotely access and manage the primary system and/or secondary storage system via a remote connection (e.g., virtual private network connection). An enterprise may be associated with a plurality of datacenters having different physical locations. The user may remotely access and manage each of the plurality of datacenters, however, a separate remote connection is required for each of the datacenters.

BRIEF DESCRIPTION OF THE DRAWINGS

Various embodiments of the invention are disclosed in the following detailed description and the accompanying drawings.

DETAILED DESCRIPTION

Figure 1:
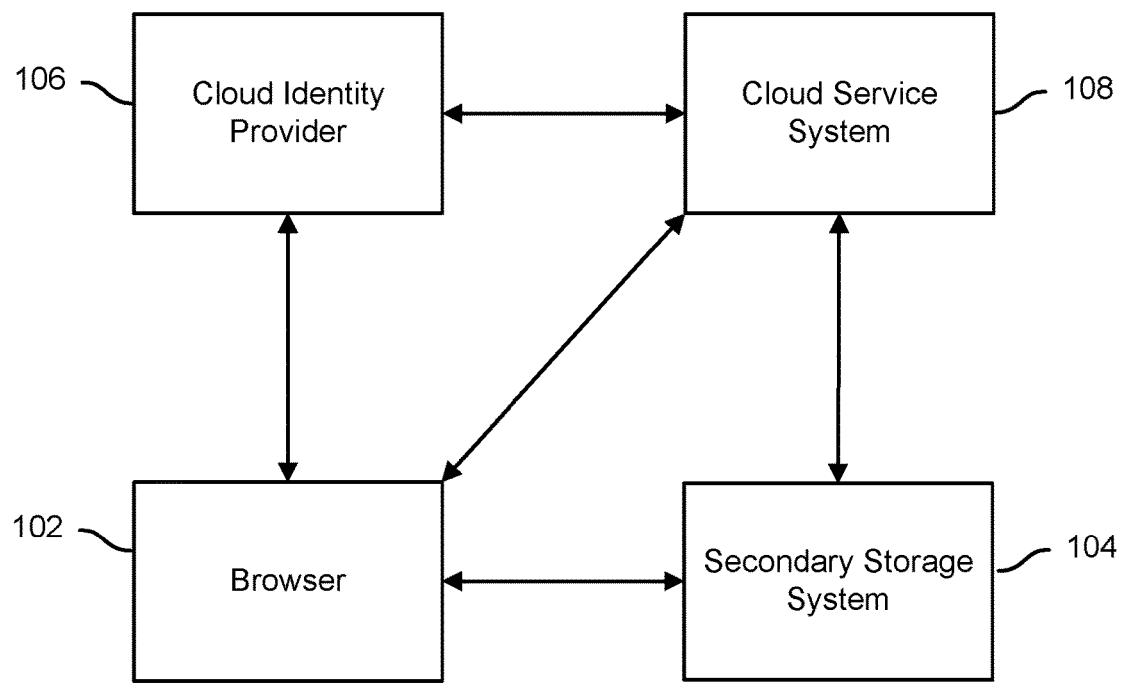
FIG. 1 is a diagram illustrating an embodiment of a system for cluster claim.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A datacenter may be comprised of a primary system and a secondary storage system. The secondary storage system may be comprised of a plurality of storage nodes (e.g., a computer cluster) located on-prem at the datacenter. The secondary storage system may cause a primary system to perform a backup snapshot according to a backup policy and to store the backup snapshot to the secondary storage system. The backup snapshot may be stored across the plurality of computing nodes. A backup snapshot represents the state of the primary system at a particular point in time (e.g., the state of the file system data). The backup policy may require a full backup snapshot or an incremental backup snapshot to be performed. A full backup snapshot stores the entire state of the primary system at a particular point in time. The file system data is comprised of a plurality of data blocks. The primary system may include a change block tracker that monitors and identifies one or more data blocks of the primary system that have changed (e.g., modified, deleted, added) since the last backup snapshot. An incremental backup snapshot includes the one or more data blocks that have changed since the last backup snapshot. The secondary storage system may send to the primary storage system a command that causes the primary system to perform a backup snapshot.

A user associated with the datacenter may access and manage the primary system and/or the secondary storage system at the physical location of the datacenter. The user associated with the datacenter may also remotely access and manage the primary system and/or the secondary storage system. For example, the user may remotely access and manage the primary and/or secondary storage system via a virtual private network (VPN) connection. However, a user associated with the datacenter may be associated with a plurality of datacenters located at different locations. For example, an enterprise may have a first datacenter located at a first location (e.g., New York) and a second datacenter located at a second location (e.g., Singapore). The user is physically incapable of being at both locations at the same time. The user may remotely access and manage the first datacenter and the second datacenter at the same time from a single location, however, such remote access and management usually requires separate browser sessions. The user may accidentally confuse the two browser sessions. For example, the user may interact with the first browser session while trying to access the data associated with the second datacenter or interact with the second browser session while trying to access the data associated with the first datacenter.

The user may be able to access and manage a plurality of datacenters via a cloud service system. The cloud service system may be configured to provide a unified management interface for all of the datacenters to which the user is associated. This enables to the user to remotely access and manage datacenters that are physically located separately throughout the world from a single location and also reduces user error because the user is able to access the data from a single browser session. For example, the user may be able to access a plurality of datacenters via the single browser session, but the cloud service system may be configured such that the user is able to interact with one of the datacenters at a time via a user interface associated with the cloud service system.

A cluster claim procedure is described herein to enable a user to access and manage one or more datacenters via a cloud service system instead of remotely managing the one or more datacenters via a remote connection (e.g., VPN connection). The cluster claim procedure registers a secondary storage system inside a datacenter with the cloud service system. A secondary storage system may be located behind a firewall. As a result, the cloud service system cannot directly establish a connection to the secondary storage system. A user associated with a datacenter must initiate the connection from the secondary storage system of the datacenter.

To manage a secondary storage system from a cloud service system, a user may log into the secondary storage system via a browser associated with a user device. The user may log into the secondary storage system using an internet protocol (IP) address associated with the secondary storage system or a virtual IP (VIP) address associated with one of the nodes of the secondary storage system. The user may enable a cluster claim via the browser associated with the user device. For example, the browser may display a user interface that allows the user to select a button, knob, etc. that enables the secondary storage system to be accessed from the cloud service system.

In response to the user enabling the cluster claim, the secondary storage system may generate cluster state information (e.g., a cluster identifier, a cluster incarnation identifier, the name of a cluster, a security token, and/or a name of a host) that allows the cloud service system to register the secondary storage system. The security token may include a nonce, a one-time password, a reusable password, etc. The name of the host corresponds to the manner in which the user logged into the secondary storage system. For example, the name of the host may correspond to a VIP address associated with one of the nodes of the secondary storage system in the event a user logged into the secondary storage system using a VIP address associated with one of the secondary storage system nodes. The name of the host may correspond to an IP address associated with the secondary storage system in the event a user logged into the secondary storage system using an IP address associated with the secondary storage system. The cluster state information may enable a cloud service system to identify the secondary storage system. The cluster state information may be generated by one of the secondary storage system nodes and propagated to the other nodes of the secondary storage system (i.e., the cluster state information is synced across the nodes). This allows any of the secondary storage nodes to finish a cluster claim procedure when directed by the cloud service system. The secondary storage system is configured to provide the cluster state information to the browser associated with the user and to cause the browser associated with the user to be redirected to a cloud identity provider. The provided cluster state information may be encrypted using a shared secret that is shared between the secondary storage system and the cloud service system. This may prevent others from registering the secondary storage system.

The cloud identity provider may request the user to provide authentication information via the browser. For example, the user may provide account information associated with the cloud identity provider, such as a username and password. The account information associated with the cloud identity provider may be associated with one or more secondary storage systems. A user may only access the one or more secondary storage systems to which the account information is associated. Upon successful authentication, the cloud identity provider may redirect the browser associated with the user to a cloud service system. The redirection may include the cluster state information and a code. The browser associated with the user is configured to provide the cluster state information and the code to the cloud service system. The cluster state information may be encrypted. The cloud service system may decrypt the encrypted cluster state information using the shared secret. The cloud service system is configured to store the cluster state information. In the event the cloud service system is unable to decrypt the encrypted cluster state information, the cloud service system may terminate the cluster claim procedure. This indicates that the cluster claim procedure was not initiated by a valid secondary storage system.

The cloud service system is configured to provide the code to the cloud identity provider and to request an access token from the cloud identity provider. The cloud identity provider may validate the code by comparing the code with the code provided in the browser redirect. The code is validated in the event the code received from the cloud service system matches the code provided in the browser redirect. Upon validating the code, the cloud identity provider is configured to provide the access token to the cloud service system. In response to receiving the access token, the cloud service system is configured to request user information based on one or more parameters. The parameter may be the access token. The cloud identity provider is configured to provide user information to the cloud service system. The user information includes account information associated with the authentication information provided by the user. The account information may indicate the one or more secondary storage systems associated with a user. The cloud service system may be configured to verify that the user information matches the cluster state information. For example, the cloud service system may be configured to verify that a cluster identifier included in the user information matches the cluster identifier included in the cluster state information. In the event the user information does not match the cluster state information, the cloud service system is configured to terminate the cluster claim procedure. In the event the user information matches the cluster state information, the cloud service system is configured to redirect the browser associated with the user to the cluster having the host name included in the cluster state information. The browser associated with the user is redirected to a node of the secondary storage system based on the manner in which the user logged into the secondary storage system. For example, the browser associated with the user is redirected to a VIP address associated with a secondary storage node in the event the user logged into the secondary storage system using the VIP address associated with a secondary storage node. In other embodiments, the browser associated with the user is redirected to an IP address associated with a secondary storage node in the event the user logged into the secondary storage system using the IP address associated with the secondary storage node.

The redirect may cause the secondary storage system to which the browser is directed to finish the cluster claim procedure. The cluster claim procedure may be finished by any of the nodes of the secondary storage system even though the host name is associated with one of the secondary storage nodes because the cluster state information has been synced to all of the secondary storage nodes. The secondary storage node handling the redirect may request a certificate from the cloud service system and provide the cluster state information to the cloud service system. The cluster state information may be encrypted. The cloud service system may compare the instance of the security token included in the cluster state information received from the secondary storage system to the instance of the security token included in the cluster state information received from the browser via the cloud identity provider redirect. In the event the second instance of the security token matches the first instance of the security token, the cloud service system is configured to provide a certificate to the secondary storage system. The certificate may enable the secondary storage system to communicate with the cloud service system. In some embodiments, the instance of the security token received from the browser via the cloud identity provider redirect is valid for a predetermined duration (e.g., 15 mins). In the event the cloud service system does not receive a security token from a secondary storage system that matches the security token received from the browser via the cloud identity provider redirect within the predetermined duration, the cloud service system is configured to deny a cluster claim. The secondary storage system is configured to store the certificate received from the cloud service system.

In response to receiving the certificate, the secondary storage system is configured to redirect the browser to the initial login page, to provide a notification indicating that the cluster claim procedure was successful, and to establish bidirectional communications between the secondary storage system and the cloud service system. In the event the cluster claim is successful, the user may access the secondary storage system via the cloud service system without having to establish a VPN connection with the cluster. The user may perform the same procedure for a plurality of other secondary storage systems. Subsequently, the user may manage the one or more secondary storage systems (and the corresponding primary systems through the secondary storage systems) via a single browser session.

FIG. 1 is a diagram illustrating an embodiment of a system for cluster claim. In the example shown, system 100 includes browser 102, secondary storage system 104, cloud identity provider 106, and cloud service system 108.

Browser 102 is associated with a user device. The user device may be a computer, a laptop, a desktop, a server, a mobile device, a smartphone, a cellular phone, a smart watch, a tablet, a personal data assistant, or any other electronic device capable of running a web browser. Browser 102 may be any web browser capable of browsing the Internet (e.g., Microsoft Internet Explorer, Google Chrome, Mozilla Firefox, Apple Safari, etc.). Browser 102 may enable a user associated with secondary storage system 104 to remotely access and manage secondary storage system 104.

Secondary storage system 104 may be part of a datacenter that is comprised of a primary system and secondary storage system 104. The primary system may be comprised of an object, virtual machine, physical entity, file system, array backup, and/or volume that stores file system data. Secondary storage system 104 may cause the primary system to perform a backup snapshot according to a backup policy and to store the backup snapshot to secondary storage system 104. A backup snapshot represents the state of the primary system at a particular point in time (e.g., the state of the file system data). The backup policy may require a full backup snapshot and/or an incremental backup snapshot to be performed. A full backup snapshot stores the entire state of the primary system at a particular point in time. The file system data is comprised of a plurality of data blocks. The primary system may include a change block tracker that monitors and identifies one or more data blocks of the primary system that have changed (e.g., modified, deleted, added) since the last backup snapshot. An incremental backup snapshot includes the one or more data blocks that have changed since the last backup snapshot.

A user associated with secondary storage system 104 may be permitted to access and manage the one or more backup snapshots stored in secondary storage system 104. For example, a user associated with secondary storage system 104 may be permitted to restore the primary system to a state associated with one of the backup snapshots stored in secondary storage system 104. A user associated with secondary storage system 104 may be permitted to restore to the primary system a file associated with one of the backup snapshots stored in secondary storage system 104. A user associated with the secondary storage system 104 may be permitted to cause the primary system associated with secondary storage system 104 to perform a backup snapshot. A user associated with secondary storage system 104 may delete one of the backup snapshots that is stored on secondary storage system 104.

In some embodiments, the user associated with secondary storage system 104 is associated with a second secondary storage system. The user associated with secondary storage system 104 may be permitted to restore the primary system associated with the second secondary storage system using one of the backup snapshots stored in secondary storage system 104. The user associated with secondary storage system 104 may be permitted to restore the primary system associated with secondary storage system 104 using one of the backup snapshots associated with the second secondary storage system.

A user associated with secondary storage system 104 may remotely access and manage secondary storage system 104. For example, a user associated with secondary storage system 104 may remotely log into secondary storage system 104 via a VPN connection. However, the user associated with secondary storage system 104 may be associated with a plurality of secondary storage systems. For example, an enterprise may have datacenters that include corresponding secondary storage systems located throughout the world for various reasons. To access and manage each of the secondary storage systems may require the user to maintain separate connections for each of the secondary storage systems.

To reduce the number of browser sessions, a user associated with secondary storage system 104 may register secondary storage system 104 with cloud service system 108. The user associated with secondary storage system 104 may also register one or more other secondary storage systems with cloud service system 108. This enables the user to access and manage the secondary storage systems from a single unified portal.

Secondary storage system 104 may be located a firewall. As a result, cloud service system 108 cannot directly initiate a connection with secondary storage system 104. However, secondary storage system 104 may initiate a process to connect with cloud service system 108.

A user associated with secondary storage system 104 via browser 102 may enable secondary storage system 104 to communicate with cloud service system 108 and initiate a cluster claim procedure. The user may log into secondary storage system 104 using an internet protocol (IP) address associated with secondary storage system 104 or a virtual IP (VIP) address associated with one of the nodes of the secondary storage system 104. In response to the user enabling secondary storage system 104 to communicate with cloud service system 108 and initiating the cluster claim procedure, secondary storage system 104 may generate cluster state information (e.g., a cluster identifier, a cluster incarnation identifier, the name of a cluster, a security token, and/or a name of a host) that allows cloud service system 108 to register secondary storage system 104. The security token may include a nonce, a one-time password, a reusable password, etc. The name of the host corresponds to the manner in which the user logged into secondary storage system 104. For example, the name of the host may correspond to a VIP address associated with one of the nodes of secondary storage system 104 in the event a user logged into secondary storage system 104 using a VIP address associated with one of the secondary storage system nodes. The name of the host may correspond to an IP address associated with one of the nodes of secondary storage system 104 in the event a user logged into secondary storage system 104 using an IP address associated with one of the secondary storage system nodes. The cluster state information enables cloud service system 108 to identify secondary storage system 104. The cluster state information may be generated by one of the secondary storage system nodes and may be propagated to the other nodes of secondary storage system 104. This allows any of the secondary storage nodes to finish a cluster claim procedure when directed by cloud service system 108.

Secondary storage system is configured to provide the cluster state information to browser 102 and to cause browser 102 to be redirected to cloud identity provider 106. The redirection may include cluster state information associated with secondary storage system 104. For example, the cluster state information may include the cluster identifier, the cluster incarnation identifier, the name of a cluster, the security token (e.g., nonce, a one-time password, reusable password, etc.), and/or the name of a host. The cluster state information included in the redirect may be encrypted using a shared secret that is shared between secondary storage system 104 and cloud service system 108

Cloud identity provider 106 (e.g., Salesforce) may be an identity provider for a cloud service. Cloud identity provider 106 may store a data structure that maps a user account with one or more secondary storage systems. Cloud identity provider 106 may request the user to provide via browser 102 authentication information associated with the user. For example, the user may provide account information associated with cloud identity provider 106, such as a username and password. The data structure associated with cloud identity provider 106 may associate the received account information with one or more secondary storage systems. The user associated with browser 102 may only access the one or more secondary storage systems that are associated with the received account information.

Upon successful authentication, cloud identity provider 106 may redirect browser 102 to cloud service system 108. The redirection may include the cluster state information and a code. Browser 102 is configured to provide the cluster state information and the code to cloud service system 108. The cluster state information may be encrypted. Cloud service system 108 may decrypt the encrypted cluster state information using the shared secret. Cloud service system is configured to store the cluster state information. Cloud service system 108 may be configured to store the cluster state information for a predetermined period of time (e.g, 15 minutes). In the event a connection is not established between cloud service system 108 and secondary storage system 104, cloud service system 108 is configured to delete the cluster state information. In the event cloud service system 108 is unable to decrypt the encrypted cluster state information, cloud service system 108 may terminate the cluster claim procedure. This indicates that the cluster claim procedure was not initiated by a valid secondary storage system.

Cloud service system 108 is configured to provide the code to cloud identity provider 106 and to request an access token from the cloud identity provider 106. The cloud identity provider may validate the code by comparing the code with the code provided in the browser redirect. The code is validated in the event the code received from the cloud service system matches the code provided in the browser redirect. Upon validating the code, cloud identity provider 106 is configured to provide the access token to cloud service system 108. In response to receiving the access token, cloud service system 108 is configured to request user information based on one or more parameters. The parameter may be the access token. Cloud identity provider 106 is configured to provide user information to cloud service system 108. The user information includes account information associated with the authentication information provided by the user. The account information may indicate the one or more secondary storage systems associated with a user. Cloud service system 108 may be configured to verify that the user information matches the cluster state information. For example, cloud service system 108 may be configured to verify that a cluster identifier included in the user information matches the cluster identifier included in the cluster state information. In the event the user information does not match the cluster state information, cloud service system 108 is configured to terminate the cluster claim procedure. In the event the user information matches the cluster state information, cloud service system 108 is configured to redirect browser 102 to the cluster having the host name included in the cluster state information. Browser 102 may be redirected to a node of secondary storage system 104 based on the manner in which the user logged into secondary storage system 104. For example, browser 102 is redirected to a VIP address associated with a secondary storage node in the event the user logged into the secondary storage system using the VIP address associated with a secondary storage node. In other embodiments, browser 102 is redirected to an IP address associated with a secondary storage node in the event the user logged into secondary storage system 104 using the IP address associated with the secondary storage node.

The redirect may cause the secondary storage system to which browser 104 is directed to finish the cluster claim procedure. The cluster claim procedure may be finished by any of the nodes of secondary storage system 104 even though the host name is associated with one of the secondary storage nodes because the cluster state information has been synced to all of the secondary storage nodes. The secondary storage node handling the redirect may request a certificate from cloud service system 108 and provide the cluster state information to the cloud service system 108. The cluster state information may be encrypted. Cloud service system 108 may compare the instance of the security token included in the cluster state information received from secondary storage system 104 to the instance of the security token included in the cluster state information received from browser 102 via the cloud identity provider 106 redirect.

In the event the second instance of the security token matches the first instance of the security token, cloud service system 108 is configured to provide a certificate to secondary storage system 104. The certificate may enable secondary storage system 104 to communicate with cloud service system 108. In some embodiments, the instance of the security token received from the cloud identity provider 106 via browser 102 is valid for a predetermined duration (e.g., 15 mins). In the event cloud service system 108 does not receive a security token from a secondary storage system that matches the security token received from cloud identity provider 106 via browser 102 within the predetermined duration, cloud service system 108 is configured to deny a cluster claim. The secondary storage system is configured to store the certificate.

The certificate is signed by cloud service system 108. The certificate may be provided back to cloud service system 108 to allow cloud service system 108 to verify that secondary storage system 104 can be trusted because it possesses a certificate that was signed by cloud service system 108. In the event the instance of the security token received from secondary storage system 104 does not match the instance of the security token received from cloud identity provider 106 via browser 102, cloud service system 108 does not provide a certificate to secondary storage system 104 and a connection cannot be established between the secondary storage system of secondary storage system 104 and cloud service system 108. Upon receiving the certificate, secondary storage system 104 is configured to store the certificate. Secondary storage system 104 includes a distributed store and the received certificate is stored in the distributed store. Secondary storage system 104 is comprised of a master storage node and a plurality of secondary storage nodes. In the event the master storage node is offline, one of the remaining storage nodes may re-establish communications with cloud service system 108 using the certificate that is stored in the distributed store.

In response to receiving the certificate, secondary storage system 104 is configured to redirect browser 102 to the initial login page, to provide a notification indicating that the cluster claim procedure was successful, and to establish bidirectional communications between secondary storage system 104 and cloud service system 108. The notification indicates that the cluster claim was successful, i.e., secondary storage system 104 is registered with cloud service system 108. In the event the cluster claim is successful, the user may access secondary storage system 104 via cloud service system 108 without having to establish a VPN connection with secondary storage system 104. The user may perform the same procedure for a plurality of other secondary storage systems. Subsequently, the user may manage the one or more secondary storage systems via a single browser session.

Figure 2:
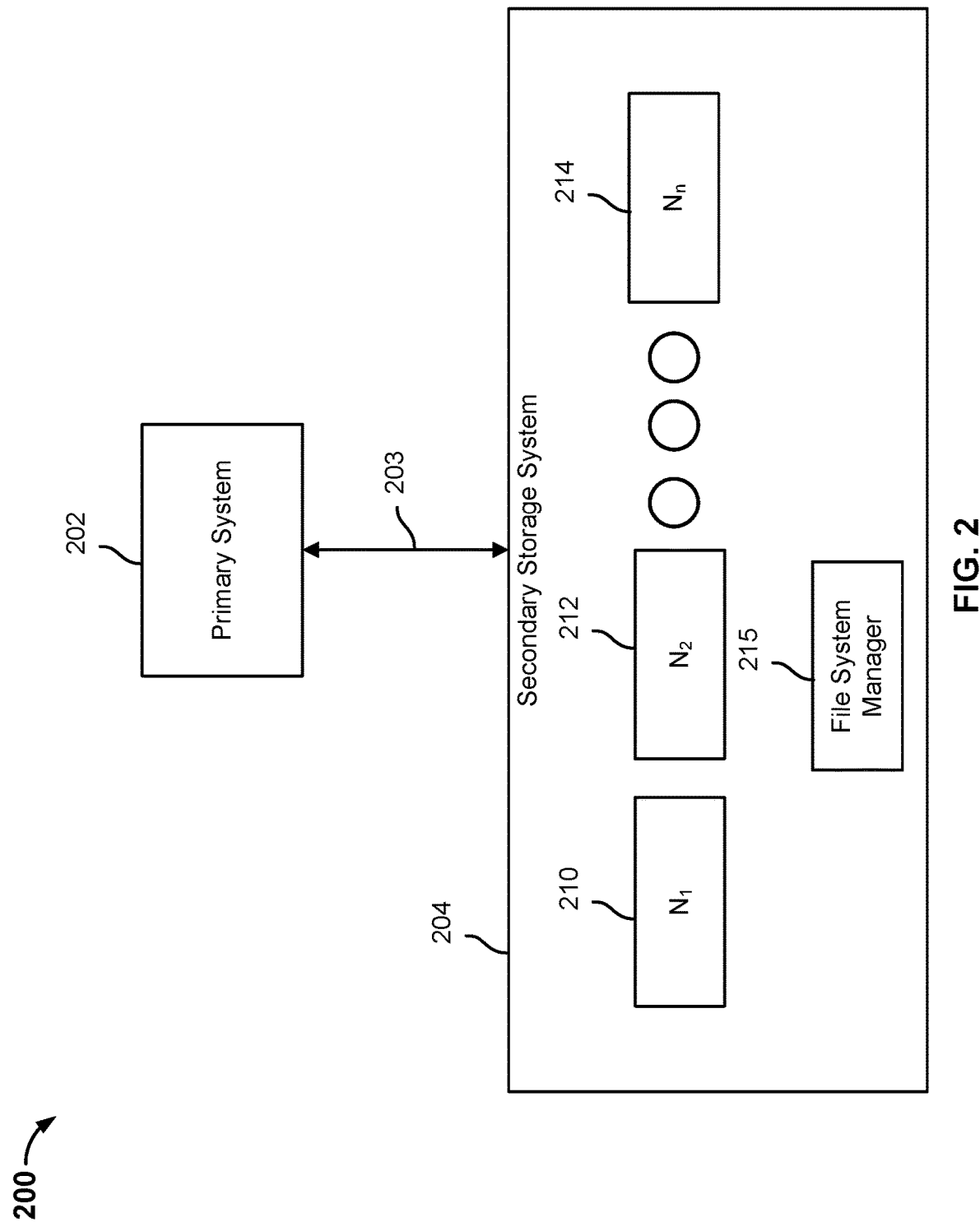
FIG. 2 is a diagram of illustrating an embodiment of a datacenter.

FIG. 2 is a diagram of illustrating an embodiment of a datacenter. In the example shown, datacenter 200 includes primary system 202 and secondary storage system 204 connected via a network 203.

Primary system 202 is a computing system that stores file system data. Primary system 202 may be comprised of one or more servers, one or more computing devices, one or more storage devices, and/or a combination thereof. In response to one or more commands received from secondary storage system 204, primary system 202 may perform a backup snapshot of the one or more storage volumes of primary system 202 to secondary storage system 204.

The backup snapshot may be a full backup snapshot or an incremental backup snapshot. Each storage volume of the primary system is comprised of file system data. A full backup snapshot includes a copy of the entire file system data of the storage volume to be backed up. An incremental backup snapshot stores the file system data that was not previously backed up.

Primary system 202 may be configured to backup file system data to secondary storage system 204 according to one or more backup policies associated with secondary storage system 204. In some embodiments, a backup policy indicates that file system data is to be backed up on a periodic basis (e.g., hourly, daily, weekly, monthly, etc.). In other embodiments, a backup policy indicates that file system data is to be backed up when a threshold size of data has changed. In other embodiments, a backup policy indicates that file system data is to be backed up upon a command from a user associated with primary system 202. For example, a user associated with primary system 202 may cause a backup snapshot to be performed via a cloud service system. The file system data may be sent from primary system 202 to secondary storage system 204 via a network 203. Network 203 may be one or more of the following: a local area network, a wide area network, a wired network, a wireless network, the Internet, an intranet, or any other appropriate communication network.

Secondary storage system 204 is configured to receive and backup file system data from primary system 202. Secondary storage system 204 may protect a large volume of applications while supporting tight business requirements (recovery time objective (RTO) and recovery point objective (RPO)). Secondary storage system 204 may unify end-to-end protection infrastructure—including target storage, provide backup, replication of data, disaster recover, and/or cloud tiering. Secondary storage system 204 may provide scale-out, globally deduped, highly available storage to consolidate all secondary data, including backups, files, and test/dev copies. Secondary storage system simplifies backup infrastructure and eliminates the need to run separate backup software, proxies, media servers, and archival. Secondary storage system 104 may be fully integrated with a virtual machine (VM) centralized management tool, such as vCenter, and an applications programming interface (API) for data protection. Secondary storage system may reduce the amount of time to perform a RPOs and support instantaneous RTOs by creating a clone of a backup VM and running the VM directly from secondary storage system 104. Secondary storage system 204 may integrate natively with one or more cloud servers. This eliminates the need to use tape archives by using one or more cloud servers for long-term data archival.

Data for the backup snapshot may be received at secondary storage system 204. Secondary storage system 204 is configured to store the file system data and organize the file system data in a tree data structure. An example of the tree data structure is a snapshot tree (e.g., Cohesity Snaptree®), which may be based on a B+ tree structure (or other type of tree structure in other embodiments). The file system data may include metadata associated with the file system data, a plurality of content files, and metadata associated with the content files. The secondary storage system may create a file system metadata snapshot tree for the backup snapshot. The metadata associated with the plurality of content files may be organized using a snapshot tree and stored in a key value store (KVS). The file system metadata snapshot tree for the backup snapshot corresponds to a version of the storage volume(s) at a particular moment in time. The secondary storage system may also create a file tree corresponding to a content file included in the backup snapshot. The file tree is a file metadata structure. The file tree may store the metadata associated with the file corresponding to the file tree. A leaf node of the file system metadata snapshot tree may include a pointer to one of the file trees, linking the contents of a content file to the file system metadata snapshot tree. A leaf node of a file tree may include a pointer to a brick storing one or more data chunks associated with a content file. A leaf node of the snapshot tree may be configured to store a key-value pair of metadata. The key-value pairs of metadata (e.g., log sequence numbers, file name, creation date, offline/online status, etc.) may be stored in the KVS.

A file system metadata snapshot tree is a tree data structure and is comprised of a root node, one or more levels of intermediate nodes, and one or more leaf nodes. In some embodiments, a file system metadata snapshot tree is comprised of a root node and one or more leaf nodes. The root node is the starting point of a file system metadata snapshot tree and may include pointers to one or more other nodes. The root node includes an identifier that indicates a view (e.g., backup snapshot) with which the root node is associated. An intermediate node is a node to which another node points (e.g., root node, other intermediate node) and includes one or more pointers to other nodes. A leaf node is a node at the bottom of a file system metadata snapshot tree. In some embodiments, a leaf node is configured to store key-value pairs of file system metadata associated with the storage volume(s). In some embodiments, a leaf node includes a pointer to a file tree. For example, a leaf node of a file system metadata snapshot tree storing metadata associated with the storage volume(s) may include a pointer to a root node of a file tree storing data associated with a content file. In some embodiments, a leaf node of a file system metadata snapshot tree or a leaf node of a file tree includes a pointer to or an identifier of a physical location storing data. For example, the physical location may be a brick storing one or more data chunks and the identifier may be a brick number corresponding to the brick storing one or more data chunks of the content file. Each node of the tree structure includes an identifier that identifies a view/backup snapshot (file system metadata snapshot tree or file tree) with which the node is associated (e.g., TreeID).

The tree data structure may be used to capture different versions of the storage volume(s) at different moments in time. A backup snapshot received from a primary system may include data associated with a first version of the storage volume(s) at a first point in time and a subsequent backup snapshot received from the primary system may include data associated with the second version of the storage volume(s) at a second point in time. Each version of the volume(s) may be represented in a corresponding file system metadata snapshot tree. The tree data structure allows a chain of file system metadata snapshot trees (i.e., each corresponding file system metadata snapshot tree) to be linked together by allowing a node of a later version of a file system metadata snapshot tree corresponding to a later version of the storage volume(s) to reference a node of a previous version of the file system metadata snapshot tree corresponding to an earlier version of the storage volume(s). The tree data structure allows a chain of file trees (i.e., each corresponding file tree) to be linked together by allowing a node of a later version of a file tree corresponding to a later version of a content file to reference a node of a previous version of the file tree corresponding to an earlier version of the content file.

Each time data for an incremental backup snapshot of the storage volume(s) is received, a new file system metadata snapshot tree is added to the corresponding tree data structure by creating a new root node. The new root node may be a clone of the root node associated with a previous file system metadata snapshot tree. Initially upon creation, the new root node includes the set of pointers included in the previous root node, that is, the new root node includes one or more pointers to an intermediate node or leaf node that was specified in the root node of a previous file system metadata snapshot tree associated with a previous backup. However, among other differences, the new root node includes a node identifier and a view identifier that is different than the node identifier and view identifier of the previous root node. The new file system metadata snapshot tree may be modified to reflect the data included in the backup of the storage volume(s) (e.g., adding one or more intermediate nodes, adding one or more leaf nodes, updating pointers associated with nodes).

A file system metadata snapshot tree is a representation of a fully hydrated backup because it provides a complete view of the storage volume(s) at a particular moment in time. Any file stored in the storage volume at a particular time and the file's contents, for which there is an associated backup, may be determined from the file system metadata snapshot tree, regardless if the associated backup snapshot was a full backup snapshot or an incremental backup snapshot. Creating an incremental backup snapshot may only include copying data of the storage volume(s) that was not previously backed up. However, the file system metadata snapshot tree corresponding to the incremental backup snapshot provides a complete view of the storage volume(s) at the particular moment in time because it includes references to data of the storage volume that was previously stored. This provides significant savings in the amount of time needed to restore or recover a storage volume and/or a database. In contrast, traditional recovery/restoration methods mount a full backup and the entirety of one or more subsequent incremental backups to create the particular version of the volume and/or database. The file system metadata snapshot tree also enables efficient retrieval of data values because each leaf node is the same number of levels away from the root node of the file system metadata snapshot tree, that is, the same number of computer transactions are used to access each leaf node of the file system metadata snapshot tree.

Secondary storage system 204 may be comprised of one or more solid state drives, one or more hard disk drives, or a combination thereof. Secondary storage system 204 may include file system manager 215. File system manager 215 is configured to maintain file system data in the form of nodes arranged in a tree data structure. In some embodiments, leaf nodes in the file system tree include key-value pairs that associate data keys with values in the form of particular items of file system data. File system manager 215 may be configured to perform one or more modifications to a snapshot tree. File system data may include data associated with one or more content files and metadata associated with the one or more content files. The metadata may include information, such as file size, directory structure, file permissions, physical storage location of the content files, time of last access, time of last modification, etc. The metadata values for the one or more content files may be stored in a KVS.

The secondary storage system 204 includes a first storage node 210, a second storage node 212, and a nth storage node 214. In some embodiments, n is an odd number. Each storage node may include a corresponding disk storage, a corresponding KVS, a corresponding processor, and a corresponding memory. A user associated with secondary storage system 204 may log into one of the storage nodes 210, 212, 214 and enable the cluster claim procedure. The user may log into one of the secondary storage system nodes using an IP address associated with the secondary storage system or a VIP address associated with one of the nodes of secondary storage system 204. In response to the user enabling the cluster claim procedure, secondary storage system 204 may generate cluster state information (e.g., a cluster identifier, a cluster incarnation identifier, the name of a cluster, a security token, and/or a name of a host) that allows a cloud service system to register secondary storage system 204. The security token may include a nonce, a one-time password, a reusable password, etc. The name of the host corresponds to the manner in which the user logged into secondary storage system 204. For example, the name of the host may correspond to a VIP address associated with one of the nodes of secondary storage system 204 in the event a user logged into secondary storage system 204 using a VIP address associated with one of the secondary storage system nodes. The name of the host may correspond to an IP address associated with one of the nodes of secondary storage system 204 in the event a user logged into secondary storage system 204 using an IP address associated with one of the secondary storage system nodes. The cluster state information generated by one of the nodes is shared with the other nodes of secondary storage system 204.

A browser redirect may cause secondary storage system 204 to finish the cluster claim procedure. The cluster claim procedure may be finished by any of the nodes of secondary storage system 204 because the cluster state information generated by one of the nodes has been shared with all of the secondary storage system nodes. The secondary storage node handling the redirect may request a certificate from a cloud service system and provide the cluster state information to the cloud service system. The cluster state information may be encrypted. The cloud service system may compare the instance of the security token included in the cluster state information received from secondary storage system 204 to the instance of the security token included in the cluster state information received from a browser via a cloud identity provider redirect. In the event the second instance of the security token matches the first instance of the security token, the cloud service system is configured to provide a certificate to secondary storage system 204. The certificate may enable secondary storage system 204 to communicate with the cloud service system. In some embodiments, the instance of the security token received from the cloud identity provider is valid for a predetermined duration (e.g., 15 mins). In the event the cloud service system does not receive a security token from secondary storage system 204 that matches the security token received from the browser via the cloud identity provider redirect within the predetermined duration, the cloud service system is configured to deny a cluster claim.

Secondary storage system 204 is configured to store the certificate. In response to receiving the certificate, secondary storage system 204 is configured to redirect a browser to the initial login page, to provide a notification indicating that the cluster claim procedure was successful, and to establish bidirectional communications between secondary storage system 204 and the cloud service system. In the event the cluster claim is successful, the user may access secondary storage system 204 via the cloud service system without having to establish a VPN connection with the cluster.

Each storage node 210, 212, 214 maintains a portion of the KVS. The key-value pairs of the KVS may be grouped into a plurality of buckets. Each node of the plurality of storage nodes includes a local KVS that stores a portion of the KVS, i.e., at least one of the plurality of buckets. Keys may be assigned to a storage node using a hashing function that generally distributes keys equally across the nodes. A master node of the plurality of storage nodes may be configured to store a master table. The master table matches a key-value pair to a storage node. Secondary storage system 204 may receive a file operation (e.g., write/read operation). The master node may inspect the master table and direct the file operation to the storage node associated with the file operation, i.e., the node that will handle the file operation.

At least one storage node in secondary storage system 204 may be designated as a backup node for the portion of the KVS that is stored on another storage node of the secondary storage system 204. For example first storage node 210 may store keys $k_{11}$ to $k_{1n}$. At least one copy of keys $k_{11}$ to $k_{1n}$ may be stored on the second storage node 212, the nth storage node 214, or any of the storage nodes between the second storage node 212 and the nth storage node 214. This provides fault tolerance and consistency for the distributed computing system in the event of a node failure. Multiple copies of keys may be stored across multiple storage nodes to increase the fault tolerance of the distributed computing system. In some embodiments, each key of the KVS is stored across a majority of the storage nodes.

Figure 3:
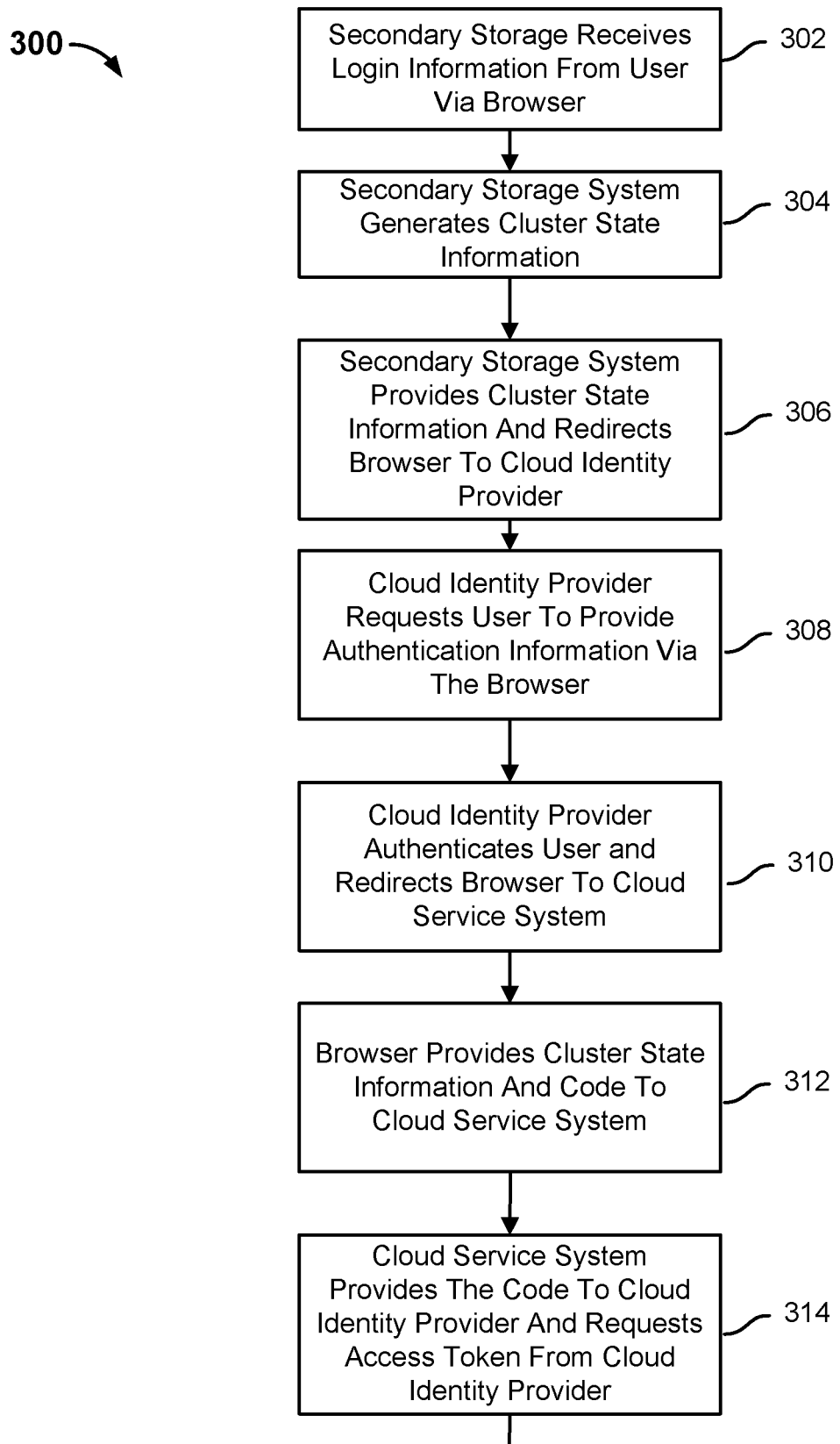
FIG. 3 is an example of an embodiment of a process for cluster claim.
Figure 3:
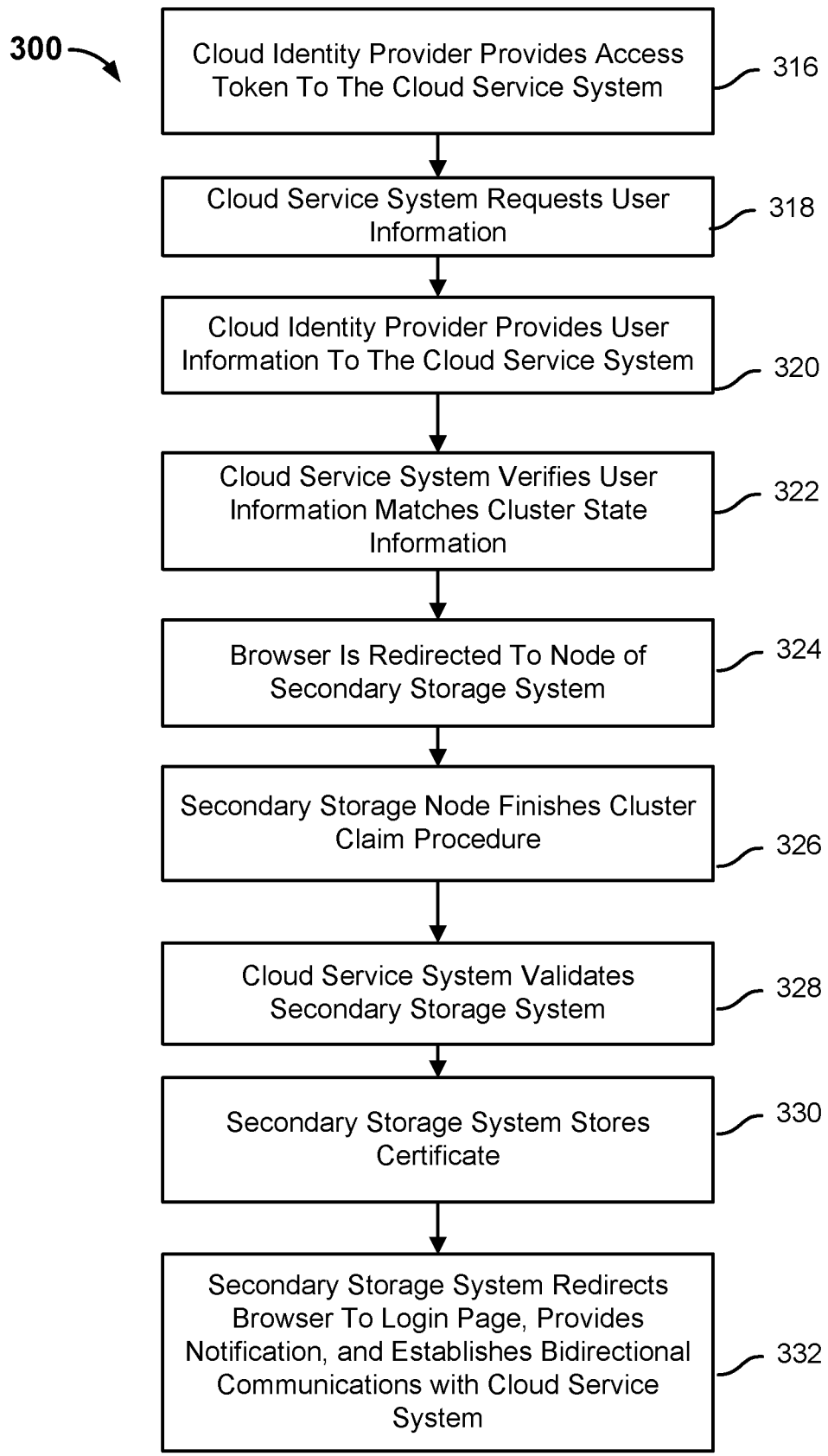

FIG. 3 is an example of an embodiment of a process for cluster claim. In the example shown, process 300 may be performed by a system for cluster claim, such as system 100.

At 302, login information is received at a secondary storage system from a user via a browser. The user may log into the secondary storage system using an internet protocol (IP) address associated with the secondary storage system or a virtual IP (VIP) address associated with one of the nodes of the secondary storage system.

In response to a successful login, the secondary storage system may provide a user interface that allows the user to enable a cluster claim. A cluster claim is a procedure that enables a user to access and manage one or more secondary storage systems via a cloud service system. A user may enable a cluster claim via the browser associated with the user device.

A user associated with the secondary storage system may be associated with a plurality of secondary storage systems. The secondary storage systems may be remote from each other. Instead of establishing a separate browser session with each secondary storage system to manage each secondary storage system, the user may desire to interact with the plurality of secondary storage systems using a single browser session.

At 304, the secondary storage system generates the cluster state information in response to the user enabling the cluster claim. The cluster state information may include a cluster identifier, a cluster incarnation identifier, a name of a cluster, a security token (e.g., nonce, a one-time password, reusable password, etc.), and/or a name of a host. The name of the host corresponds to the manner in which the user logged into the secondary storage system. For example, the name of the host may correspond to a VIP address associated with one of the nodes of the secondary storage system in the event a user logged into the secondary storage system using a VIP address associated with one of the secondary storage system nodes. The name of the host may correspond to an IP address associated with one of the nodes of the secondary storage system in the event a user logged into the secondary storage system using an IP address associated with one of the secondary storage system nodes. A storage node of the secondary storage system is configured to generate the cluster state information and to propagate the generated cluster state information to the other nodes of the secondary storage systems. This enables any of the secondary storage system nodes to complete the cluster claim procedure when directed by a cloud service system. The cluster state information allows the cloud service system to identify a secondary storage system that is requesting a cluster claim to be established.

At 306, cluster state information is provided from the secondary storage system to the browser associated with a user and the browser associated with the user is redirected to a cloud identity provider. In some embodiments, the provided cluster state information is encrypted using a shared secret that is shared between a secondary storage system and a cloud service system. This prevents non-authorized users from attempting to register the secondary storage system.

At 308, the cloud identity provider requests the user to provide authentication information via the browser. For example, the user may provide account information associated with the cloud identity provider, such as a username and password. The user logs into the cloud identity provider and the browser associated with the user provides the cluster state information to the cloud identity provider. The account information associated with the cloud identity provider may be associated with one or more secondary storage systems. A user may only access the one or more secondary storage systems to which the account information associated with the cloud identity provider is associated.

At 310, the cloud identity provider authenticates the user and redirects the browser associated with the user to a cloud service system. The redirect includes the cluster state information and a code.

At 312, the browser associated with the user provides the cluster state information and the code to the cloud service system. The cluster state information may be encrypted. The cloud service system may decrypt the encrypted cluster state information using the shared secret. The cloud service system is configured to store the cluster state information. In the event the cloud service system is unable to decrypt the encrypted cluster state information, the cloud service system may terminate the cluster claim procedure. This indicates that the cluster claim procedure was not initiated by a valid secondary storage system.

At 314, the cloud service system provides the code to the cloud identity provider and requests an access token from the cloud identity provider.

At 316, in response to validating the code, the cloud identity provider provides the access token to the cloud service system. At 318, in response to receiving the access token, the cloud service system requests user information based on one or more parameters. The parameter may be the access token. At 320, the cloud identity provider provides user information to the cloud service system. The user information includes account information associated with the authentication information provided by the user. The account information may indicate the one or more secondary storage systems associated with a user.

At 322, the cloud service system is configured to verify that the user information matches the cluster state information. For example, the cloud service system may be configured to verify that a cluster identifier included in the user information matches the cluster identifier included in the cluster state information. In the event the user information does not match the cluster state information, the cloud service system is configured to terminate the cluster claim procedure. In the event the user information matches the cluster state information, the cloud service system is configured to redirect the browser associated with the user to the cluster having the host name included in the cluster state information.

At 324, the browser associated with the user is redirected to a node of the secondary storage system based on the manner in which the user logged into the secondary storage system. For example, the browser associated with the user is redirected to a VIP address associated with a secondary storage node in the event the user logged into the secondary storage system using the VIP address associated with a secondary storage node. In other embodiments, the browser associated with the user is redirected to an IP address associated with a secondary storage node in the event the user logged into the secondary storage system using the IP address associated with the secondary storage node.

At 326, the redirect may cause the secondary storage system to which the browser is directed to finish the cluster claim procedure. The cluster claim procedure may be finished by any of the nodes of the secondary storage system even though the host name is associated with one of the secondary storage nodes because the cluster state information has been synced to all of the secondary storage nodes. The secondary storage node handling the redirect may request a certificate from the cloud service system and provide the cluster state information to the cloud service system. The cluster state information may be encrypted.

At 328, the cloud service system is configured to validate the secondary storage system at least in part by comparing the second instance of the security token included in the cluster state information received from the secondary storage system to the first instance of the security token included in the cluster state information received from the browser via the cloud identity provider redirect. In the event the second instance of the security token matches the first instance of the security token, the cloud service system is configured to provide a certificate to the secondary storage system. The certificate may enable the secondary storage system to communicate with the cloud service system. In some embodiments, the instance of the security token received from the cloud identity provider is valid for a predetermined duration (e.g., 15 mins). In the event the cloud service system does not receive a security token from a secondary storage system that matches the security token received from the cloud identity provider within the predetermined duration, the cloud service system is configured to deny a cluster claim.

At 330, the secondary storage system is configured to store the certificate. The secondary storage system includes a distributed store and the received certificate is stored in the distributed store. The secondary storage system is comprised of a master storage node and a plurality of secondary storage nodes. In the event the master storage node is offline, one of the remaining storage nodes may re-establish communications with the cloud service system using the certificate that is stored in the distributed store.

At 332, the secondary storage system is configured to redirect the browser to the initial login page, to provide a notification indicating that the cluster claim procedure was successful, and to establish bidirectional communications between the secondary storage system and the cloud service system.

In the event the cluster claim is successful, the user may access and manage the secondary storage system via the cloud service system without having to establish a VPN connection with the secondary storage system. The user may perform the same procedure for a plurality of other secondary storage systems. Subsequently, the user may manage the plurality of secondary storage systems via a single browser session.

Figure 4:
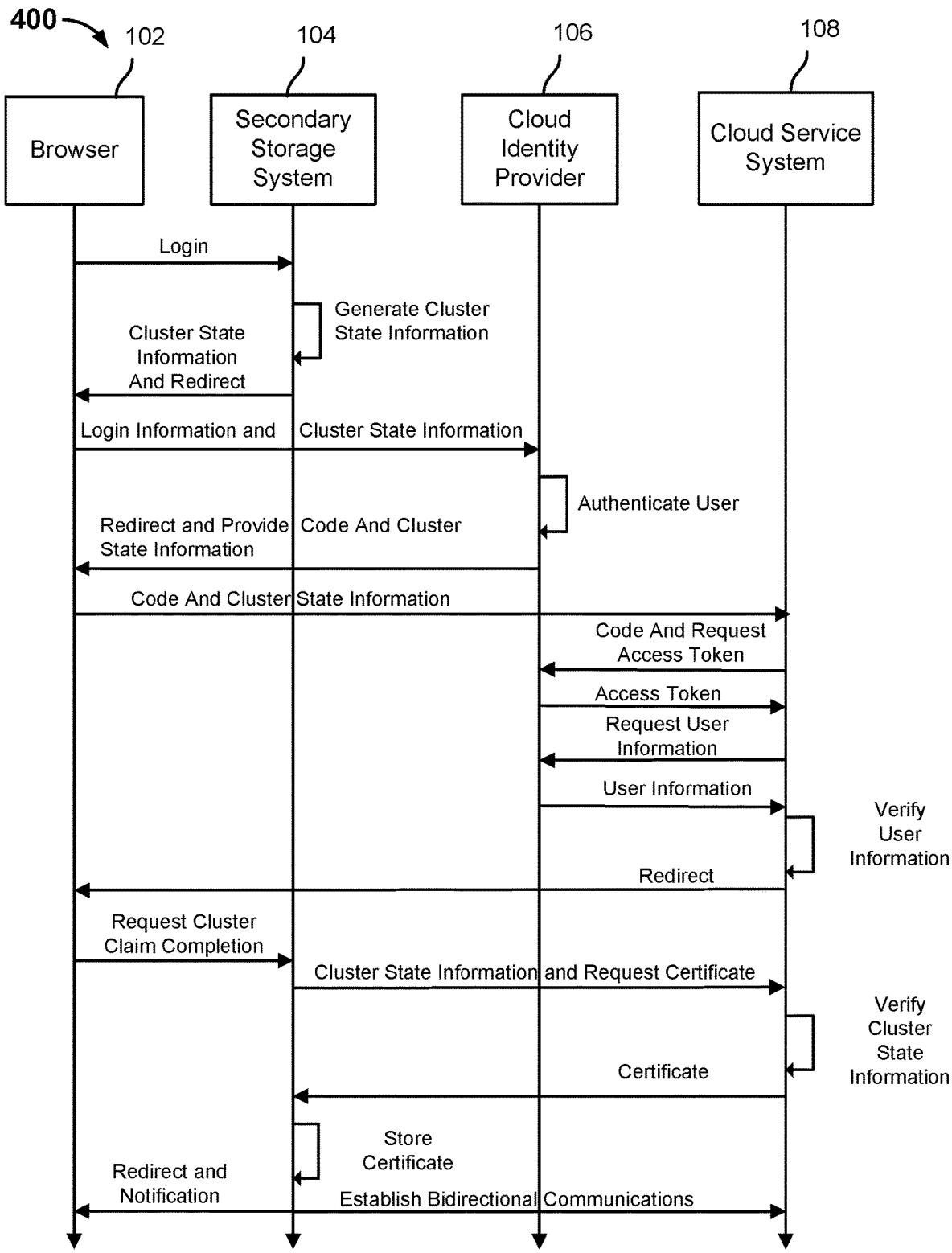
FIG. 4 is a diagram illustrating an embodiment of a timeline of a cluster claim procedure.

FIG. 4 is a diagram illustrating an embodiment of a timeline of a cluster claim procedure. In the example shown, timeline 400 may be implemented by a system for cluster claim, such as system 100.

Browser 102 logs into secondary storage system 104. A user associated with browser 102 may log into secondary storage system 104 using an internet protocol (IP) address associated with the secondary storage system or a virtual IP (VIP) address associated with one of the nodes of the secondary storage system. In response to a successful login, secondary storage system 104 may provide a user interface that allows a user associated with browser 102 to enable a cluster claim.

Secondary storage system 104 is configured to generate cluster state information in response to the user enabling the cluster claim. The cluster state information may include a cluster identifier, a cluster incarnation identifier, a name of a cluster, a security token (e.g., nonce, a one-time password, reusable password, etc.), and/or a name of a host. The cluster state information allows cloud service system 108 to identify a secondary storage system of a data center that is requesting a cluster claim to be established. The name of the host corresponds to the manner in which the user logged into the secondary storage system. For example, the name of the host may correspond to a VIP address associated with one of the nodes of the secondary storage system in the event a user logged into the secondary storage system using a VIP address associated with one of the secondary storage system nodes. The name of the host may correspond to an IP address associated with the secondary storage system in the event a user logged into the secondary storage system using an IP address associated with the secondary storage system. The cluster state information may be generated by one of the secondary storage system nodes and propagated to the other nodes of the secondary storage system. This allows any of the secondary storage nodes to finish a cluster claim procedure when directed by the cloud service system.

Secondary storage system 104 provides the cluster state information to browser 102 and browser 102 is redirected to a cloud identity provider 106. The cluster state information may be encrypted using a shared secret that is shared between secondary storage system 104 and cloud service system 108. Cloud identity provider 106 requests the user to provide authentication information via the browser 102. For example, the user may provide account information associated with cloud identity provider 106, such as a username and password.

The user logs into cloud identity provider 106 and browser 102 provides the cluster state information to cloud identity provider 106. The account information associated with the cloud identity provider may be associated with one or more secondary storage systems. A user may only access the one or more secondary storage systems to which the account information associated with the cloud identity provider is associated.

Cloud identity provider 106 authenticates the user. For example, the user may provide account information associated with the cloud identity provider, such as a username and password. The account information associated with the cloud identity provider may be associated with one or more secondary storage systems. A user may only access the one or more secondary storage systems to which the account information is associated.

Cloud identity provider 106 redirects browser 102 to cloud service system 108. The redirect includes the cluster state information and a code.

Browser 102 provides the cluster state information and the code to cloud service system 108. The cluster state information may be encrypted. The cloud service system may decrypt the encrypted cluster state information using the shared secret. The cloud service system is configured to store the cluster state information. In the event the cloud service system is unable to decrypt the encrypted cluster state information, the cloud service system may terminate the cluster claim procedure. This indicates that the cluster claim procedure was not initiated by a valid secondary storage system.

Cloud service system 108 provides the code to cloud identity provider 106 and to request an access token from cloud identity provider 106. Cloud identity provider 106 may validate the code by comparing the code with the code provided in the browser redirect. The code is validated in the event the code received from cloud service system 108 matches the code provided in the browser 102 redirect.

Upon validating the code, cloud identity provider 106 provides the access token to cloud service system 108.

In response to receiving the access token, cloud service system 108 is configured to request user information based on one or more parameters. The parameter may be the access token.

Cloud identity provider 108 is configured to provide user information to cloud service system 108. The user information includes account information associated with the authentication information provided by the user. The account information may indicate the one or more secondary storage systems associated with a user.

Cloud service system 108 verifies that the user information matches the cluster state information. For example, the cloud service system may be configured to verify that a cluster identifier included in the user information matches the cluster identifier included in the cluster state information. In the event the user information does not match the cluster state information, cloud service system 108 is configured to terminate the cluster claim procedure. In the event the user information matches the cluster state information, cloud service system 108 is configured to redirect the browser 108 to the secondary storage system having the host name included in the cluster state information.

Browser 102 is redirected to a node of secondary storage system 104 based on the manner in which the user logged into secondary storage system 104. For example, the browser associated with the user is redirected to a VIP address associated with a secondary storage node in the event the user logged into secondary storage system 104 using the VIP address associated with a secondary storage node. In other embodiments, browser 102 is redirected to an IP address associated with a secondary storage node in the event the user logged into secondary storage system 104 using the IP address associated with the secondary storage node.

The redirect causes secondary storage system 104 to finish the cluster claim procedure. The cluster claim procedure may be finished by any of the nodes of the secondary storage system even though the host name is associated with one of the secondary storage nodes because the cluster state information has been synced to all of the secondary storage nodes.

The secondary storage node of secondary storage system 104 handling the redirect may request a certificate from cloud service system 108 and provide the cluster state information to the cloud service system 108. The cluster state information may be encrypted. The cloud service system may compare the second instance of the security token included in the cluster state information received from the secondary storage system to the first instance of the security token included in the cluster state information received from the browser via the cloud identity provider redirect.

In the event the second instance of the security token matches the first instance of the security token, cloud service system 108 is configured to provide a certificate to secondary storage system. The certificate may enable secondary storage system 108 to communicate with cloud service system 108. In some embodiments, the instance of the security token received from browser 102 via cloud identity provider 106 is valid for a predetermined duration (e.g., 15 mins). In the event cloud service system 108 does not receive a security token from a secondary storage system that matches the security token received from the cloud identity provider within the predetermined duration, the cloud service system is configured to deny a cluster claim. Secondary storage system 104 stores the certificate.

In response to receiving the certificate, the secondary storage system is configured to redirect browser 102 to the initial login page, to provide a notification indicating that the cluster claim procedure was successful, and to establish bidirectional communications between secondary storage system 104 and cloud service system 108. In the event the cluster claim is successful, the user may access the secondary storage system via the cloud service system without having to establish a VPN connection with the cluster. The user may perform the same procedure for a plurality of other secondary storage systems. Subsequently, the user may manage the one or more secondary storage systems via a single browser session.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   generating, by a secondary storage system, cluster state information in response to a request to establish a connection with a cloud service system, wherein the cluster state information includes a first instance of a security token;
   providing, by the secondary storage system, the cluster state information to a web browser associated with a user, wherein the web browser associated with the user is redirected to a cloud identity provider, wherein the cloud identity provider authenticates the user and upon successful authentication, the cloud identify provider redirects the web browser associated with the user to the cloud service system, wherein a redirection includes the cluster state information, wherein the cluster state information that includes the first instance of the security token;
   requesting, by the secondary storage system, from the cloud service system a certificate; and
   providing, by the secondary storage system, to the cloud service system the cluster state information that includes a second instance of the security token, wherein the cloud service system is configured to establish the connection between itself and the secondary storage system based on a comparison between first instance of the security token and the second instance of the security token.

2. The method of claim 1, further comprising receiving from the web browser associated with the user, the request to establish the connection with the cloud service system.

3. The method of claim 1, wherein the redirection includes a code.

4. The method of claim 3, wherein the cloud service system provides the code to the cloud identity provider and requests from the cloud identity provider an access token.

5. The method of claim 4, wherein the cloud identity provider provides the access token, wherein the cloud service system requests user information associated with the access token.

6. The method of claim 5, wherein the cloud service system receives the user information and verifies the user information based on the cluster state information.

7. The method of claim 6, wherein the cloud service system redirects the web browser associated with the user to a particular node of a secondary storage system based on host information included in the cluster state information.

8. The method of claim 7, wherein the secondary storage system receives the redirect causes any node of the secondary storage system to handle the redirect.

9. The method of claim 8, wherein the node of the secondary storage system handling the redirect sends to the cloud service system the cluster state information that includes the second instance of the security token and sends the request for the certificate.

10. The method of claim 1, wherein the cloud service system stores the cluster state information received from the cloud identity provider via the web browser for a predetermined period of time.

11. The method of claim 10, wherein the cloud service system establishes the connection in the event the second instance of the security token included in the cluster state information received from a node of a secondary storage system handling the request is received within the predetermined period of time.

12. The method of claim 1, wherein the web browser associated with the user is permitted to access and manage a secondary storage system via the cloud service system after the connection is established.

13. The method of claim 12, wherein in response to a command, the web browser associated with user causes a backup snapshot from a primary system associated with the secondary storage system to the secondary storage system via the cloud service system.

14. The method of claim 1, wherein the cluster state information includes host information that is based on a manner in which the user logs into a secondary storage system via the web browser.

15. The method of claim 1, wherein the cloud service system registers a plurality of secondary storage systems associated with the user, wherein the cloud service system enables the user to manage the plurality of secondary storage systems via the cloud service system.

16. The method of claim 1, wherein the cluster state information is encrypted using a shared secret known to a secondary storage system and the cloud service system.

17. The method of claim 16, wherein the cloud service system decrypts the encrypted cluster state information using the shared secret.

18. The method of claim 17, wherein the cloud service system prevents the connection from being established in the event the cloud service system is unable to decrypt the encrypted cluster state information using the shared secret.

19. A computer program product, the computer program product being embodied in a non-transitory computer readable storage medium and comprising computer instructions for:
- generating, by a secondary storage system, cluster state information in response to a request to establish a connection with a cloud service system, wherein the cluster state information includes a first instance of a security token;
- providing, by the secondary storage system, the cluster state information to a web browser associated with a user, wherein the web browser associated with the user is redirected to a cloud identity provider, wherein the cloud identity provider authenticates the user and upon successful authentication, the cloud identify provider redirects the web browser associated with the user to the cloud service system, wherein a redirection includes the cluster state information, wherein the cluster state information that includes the first instance of the security token;
- requesting, by the secondary storage system, from the cloud service system a certificate; and
- providing, by the secondary storage system, to the cloud service system the cluster state information that includes a second instance of the security token, wherein the cloud service system is configured to establish the connection between itself and the secondary storage system based on a comparison between first instance of the security token and the second instance of the security token.

20. A secondary storage system, comprising:
a processor configured to:
- generate cluster state information in response to a request to establish a connection with a cloud service system, wherein the cluster state information includes a first instance of a security token;
- provide the cluster state information to a web browser associated with a user, wherein the web browser associated with the user is redirected to a cloud identity provider, wherein the cloud identity provider is configured to authenticate the user and upon successful authentication, the cloud identify provider is configured to redirect the web browser associated with the user to the cloud service system, wherein a redirection includes the cluster state information, wherein the cluster state information that includes the first instance of the security token;
- request, by the secondary storage system, from the cloud service system a certificate; and
- provide, by the secondary storage system, to the cloud service system the cluster state information that includes a second instance of the security token, wherein the cloud service system is configured to establish the connection between itself and the secondary storage system based on a comparison between first instance of the security token and the second instance of the security token; and a memory coupled to the processor and configured to provide the processor with instructions.

* * * * *